Dec. 22, 1936.    G. I. ROBERTS ET AL    2,065,028
MEANS FOR SYNCHRONIZING SOUND AND MOTION PICTURE FILMS
Filed July 29, 1933    4 Sheets-Sheet 1
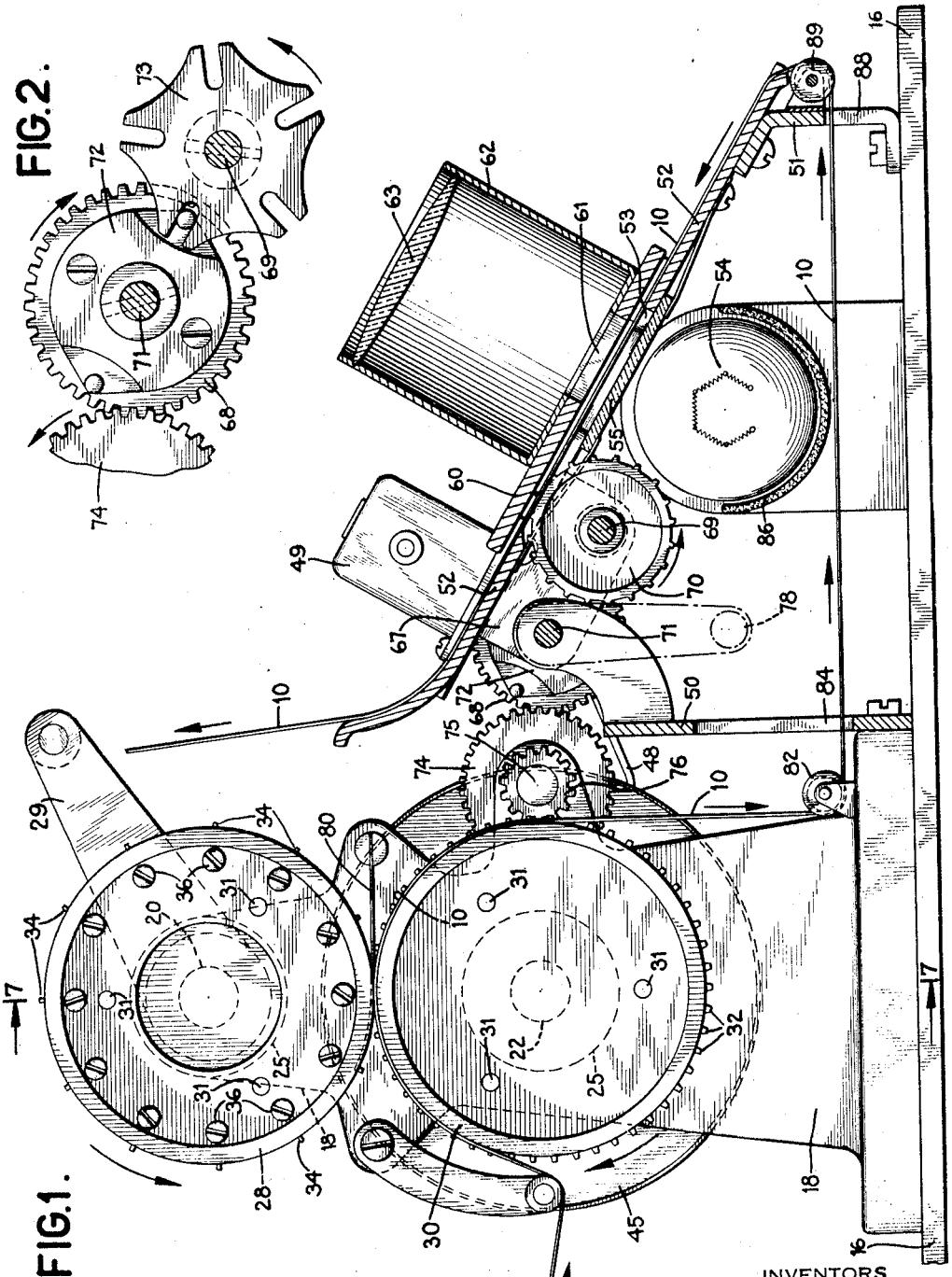
INVENTORS
*GORDON I. ROBERTS*
*GEORGE H. RUFLE*
BY Frederick Griswold, Jr.
ATTORNEY

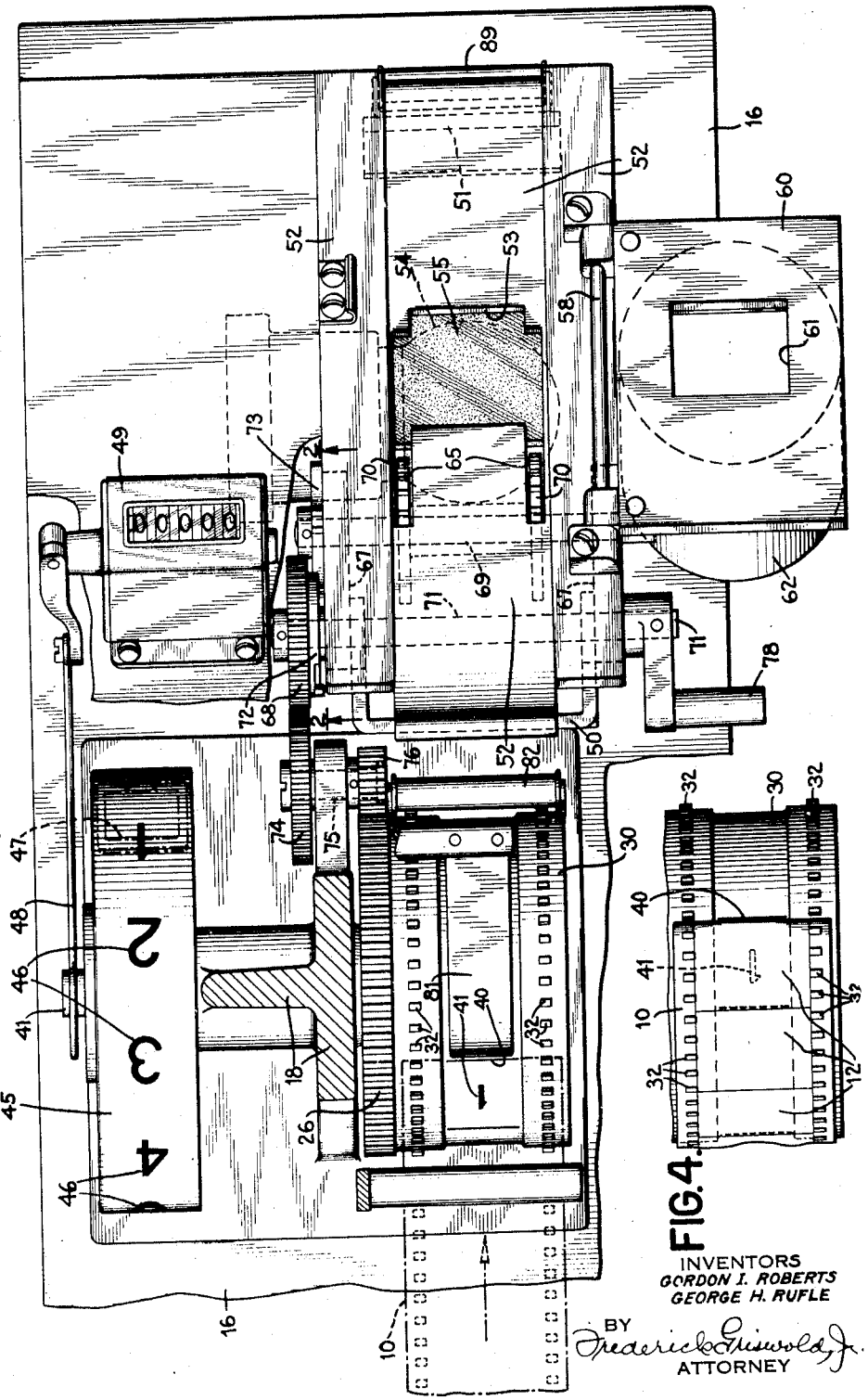

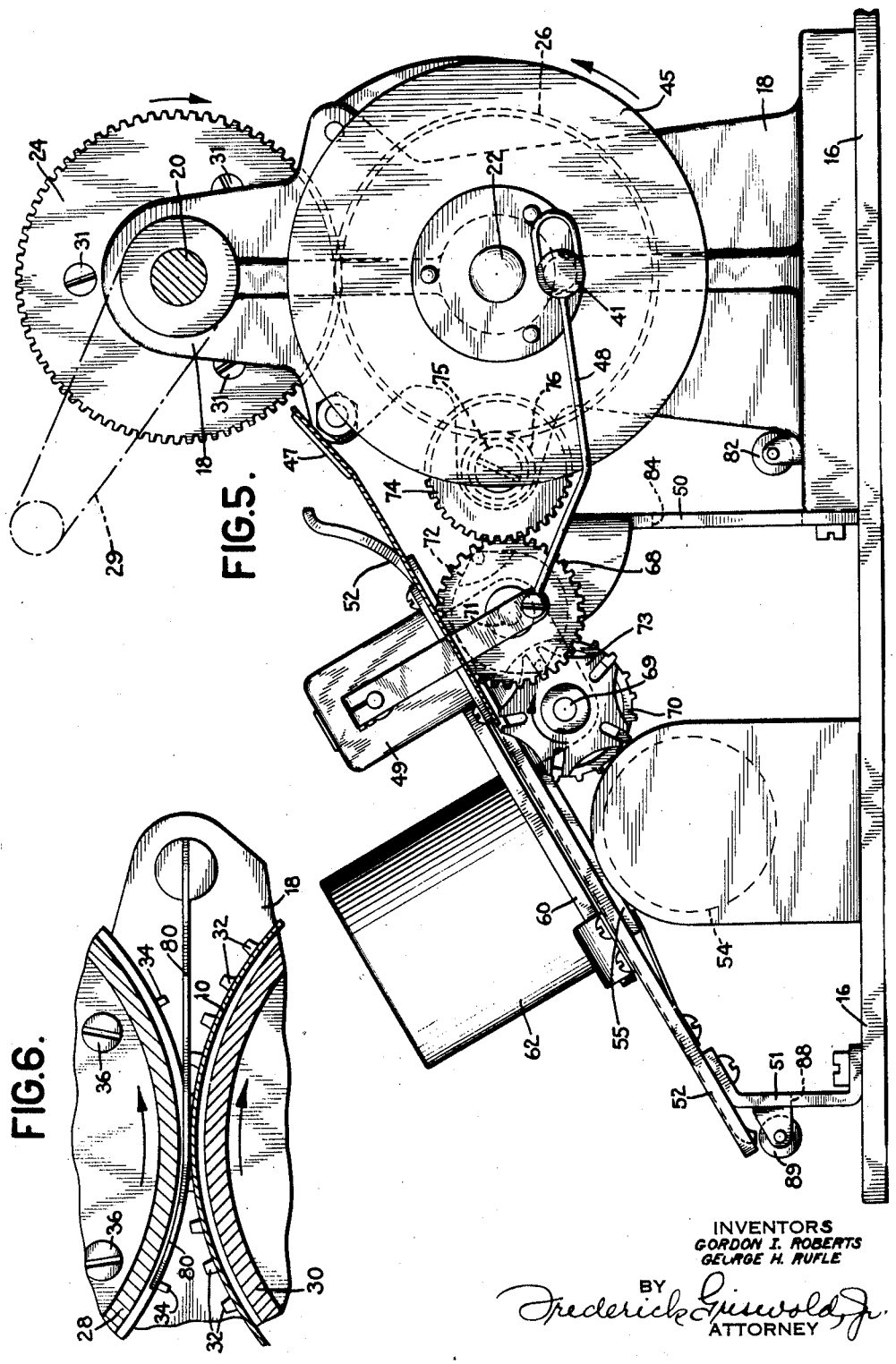

Dec. 22, 1936.  G. I. ROBERTS ET AL  2,065,028
MEANS FOR SYNCHRONIZING SOUND AND MOTION PICTURE FILMS
Filed July 29, 1933  4 Sheets-Sheet 4
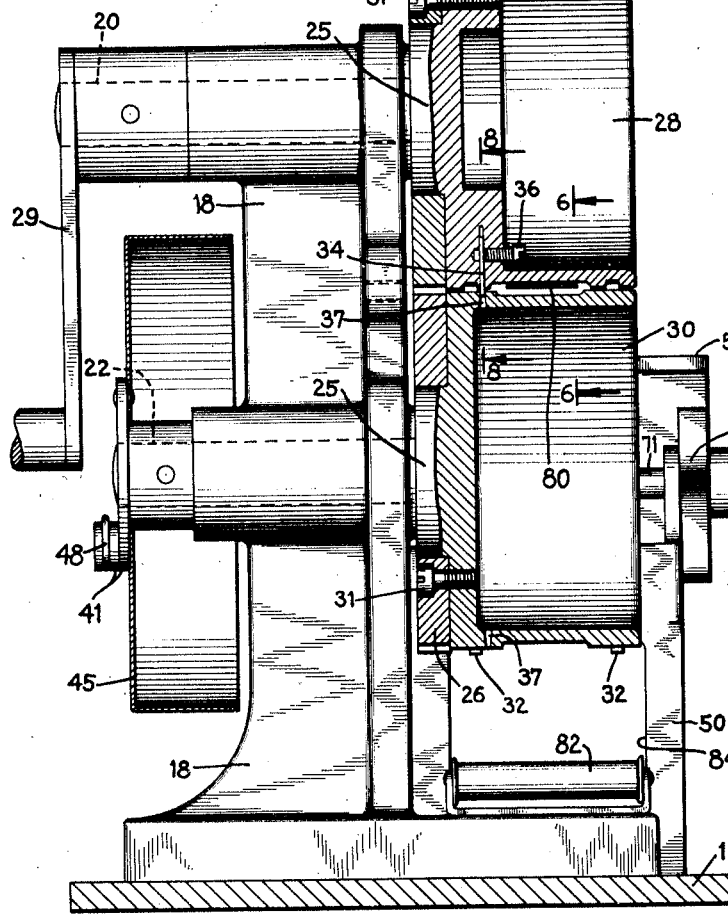
FIG.7.
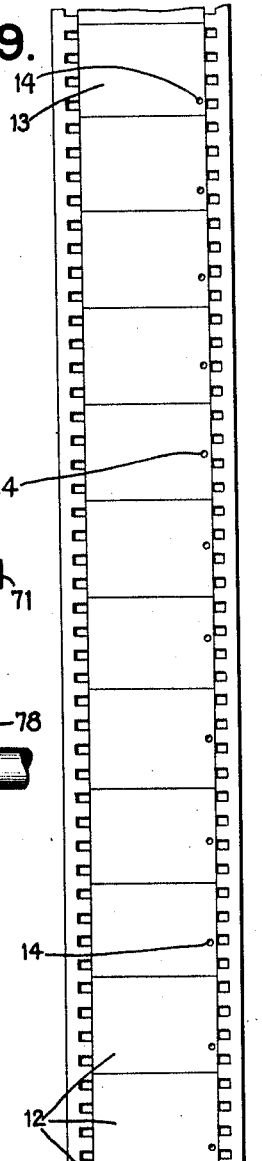
FIG.9.
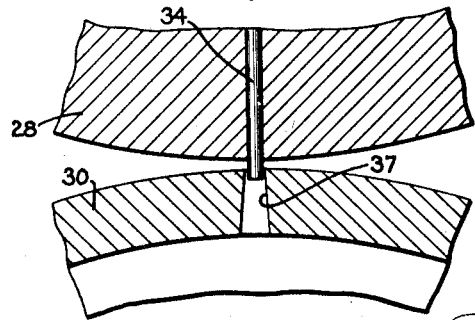
FIG.8.
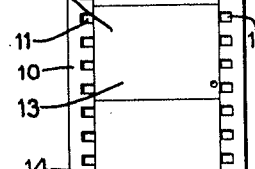
INVENTORS
GORDON I. ROBERTS
GEORGE H. RUFLE
BY Frederick Griswold Jr.
ATTORNEY Patented Dec. 22, 1936

2,065,028

UNITED STATES PATENT OFFICE 2,065,028

MEANS FOR SYNCHRONIZING SOUND AND MOTION PICTURE FILMS

Gordon I. Roberts, Mount Vernon, and George H. Rufle, Astoria, N. Y.; said Roberts assignor to said Rufle Application July 29, 1933, Serial No. 682,768

8 Claims. (Cl. 88—16)

This invention relates to the making of sound synchronized motion pictures wherein the sound is recorded and synchronized with respect to pictures previously taken, and more particularly to work films, so called, and the apparatus and method by which they are produced.

The sound with which motion pictures are exhibited, is usually recorded photographically on a sound track extending along one side of the film. Ordinarily, the sound accompanies the performance of the action photographed but with films made from animated drawings, commonly called cartoons, a negative or work film is first produced on which the performance is photographed. The motion picture is then projected on to a screen before an orchestra or sound crew and the music recorded and subsequently photographically recorded on the sound track area. In recording the music, the orchestra or sound crew performs under the direction of a conductor whose function it is to synchronize the sound with the action portrayed on the screen.

Silent films made before the advent of sound pictures are, in many instances, capable of use with music and/or sound effects. Many such old films are now being "put to music" but the arrangement of the orchestral score for such old pictures and the subsequent production of the sound effect and/or music is both laborious and attended with error. At the present time, after music has been selected, the tempo of which will synchronize with the action of the characters on the film, it is necessary, in adapting the music and/or sound effect to the action, to arrange the score by painstakingly examining each exposure on the film, comparing it with the music and inscribing on the score at the proper places, appropriate symbols representing the sound effects to be produced at those points in the action. It will be readily apparent that where a person merely looks at a succession of exposures on a film held in the hand or laid on the table before him, an attempt to segregate and allocate succeeding notes on the score to the various pictures that error is likely to occur. Then, when the old silent film is exhibited before the orchestra or sound crew during the recording of the sound, where the director of the sound crew has nothing to follow but the silent picture exhibited on the screen and the score before him, the synchronizing of the sound is not always correct.

The present invention has for one of its objects means whereby a tempo indication can be automatically applied to a film, of any kind, which tempo indication will then be visible in the projection of the picture to unfailingly give a visual indication of the tempo to the director and his sound crew.

Another object of the invention is to enable a person placing symbols of sound effect on the score to readily view the film already bearing a predetermined tempo indication and to afford to such person a visible indication of the tempo. To this end, scales are provided automatically actuated as the film is fed step-by-step before the eyes of the observer, which scales bear indicia having a definite relation to the score whereby the indications of sound effect on the score may be applied almost automatically.

The invention also has to do with a film having a novel and efficacious indication of the tempo whereby, when such film is projected, the tempo indication appears on the screen and is visible to the sound crew and its director.

The invention further seeks an instrumentality whereby the foregoing objects may be accomplished which is practical from the standpoint of simplicity and cheapness of manufacture and ease and convenience in use.

These and other objects of the invention and the means for their attainment will be more apparent from the following detailed description taken in connection with the accompanying drawings illustrating one embodiment by which the invention may be realized and in which:

Figure 1 is a view in side elevation and partly in section showing apparatus in accordance with this invention;

Figure 2 is a detail view showing timing devices whereby a film is advanced before the eye of an observer synchronously with the movement of the film through the machine during the application of tempo indications thereto;

Figure 3 is a plan view of the machine shown in Figure 1;

Figure 4 is a fragmentary detail view showing how a film is started through the machine;

Figure 5 is a view in side elevation showing the machine taken from the side opposite to that of Figure 1;

Figure 6 is an enlarged fragmentary view, in vertical section, taken in the plane indicated by the line 6—6 of Figure 7, and showing means by which the tempo indications are applied to the machine;

Figure 7 is a transverse vertical view taken in the plane indicated by the line 7—7 of Figure 1, and showing the means for applying the tempo indications to a film;

Figure 8 is a fragmentary view in transverse section taken in the plane indicated by the line 8—8 of Figure 7, looking in the direction of the arrows; and Figure 9 is a view showing a section of film bearing the tempo indication of this invention.

While the invention is applicable to any kind of film such as a work film provided with an area subsequently to be occupied by a sound track, there is shown (Figure 9) a strip 10 of film of the silent type, comprising a number of exposures or frames 12. In accordance with this invention, perforations 14 are formed on the frames, respectively, a predetermined successively increasing or decreasing distance above the bottom of the frames, dependent upon the tempo adopted. When this film is projected on a screen, a spot of light appears thereon along one edge, as a flash, and this spot of light appears to move up and down in a vertical line as the film progresses through the projector giving the effect of movement the same as that produced by an incandescent lamp on the end of the baton of an orchestra leader in beating time. Thus, for a beat of twelve, as indicated in Figure 9, the perforation commencing near the bottom of one frame 13, which for convenience will be referred to as the beat frame, is progressively higher in each frame for five succeeding frames; is at the same height in the sixth frame and then is progressively nearer to the bottom for five succeeding frames until on the twelfth frame the perforations producing the spot of light is at the same distance above the bottom as that on the first frame. This is repeated in each group throughout the film commencing with another beat frame 13. While the perforations have been illustrated and described as formed in the respective frames of a silent film, it will be obvious that such perforations may be formed equally well in the area subsequently to be occupied by the sound track of any work film, especially one of animated drawings. The term film is, therefore, to be understood as intended for any film with which music is to be synchronized.

The apparatus in accordance with this invention perforates the film in the manner described for any predetermined tempo and then utilizes the movement of the film through the same or a subsequent mechanism to give a person marking the score an indication of the particular subdivision of a beat and of the particular beat and thus make it very easy to locate the desired bar and the particular note of that bar over which to mark a symbol of appropriate sound or otherwise revise the music.

Referring now to Figure 1, near one end of a base 16 is mounted a frame 18 in which is journalled upper and lower shafts 20 and 22, respectively. Each of these shafts carries a hub 25 which is affixed one of a pair of tempo marking and film advancing drums 28 and 30. These drums 28 and 30 are of such diameter as to receive with proper spacing the requisite number of punches to record the desired tempo on the film. As shown, the drums are conveniently cup-shaped and are integral with the respective shafts and have secured to the hubs 25, as by the screws 31, the gears 24, 26 by which they are driven one from another. One of the shafts, say, the upper shaft 20, may be rotated as by a crank 29 by which the drum 28 and gear 24 are rotated and through the latter the gear 26 and drum 30. One of the drums, as shown, the lower or sprocket drum 30, is provided with sprocket teeth 32 adapted to receive the sprocket holes 11 in the film by which the film is positioned and advanced through the machine. The sprocket teeth 32 are received in corresponding recesses 33 in the upper drum 28.

The upper drum 28 is also provided with a plurality of radially disposed removable and adjustable punch pins 34 whereby the tempo perforations 14 are formed in the film. The punch pins 34 are conveniently removably and adjustably secured in position as by clamping screws 36. These punch pins 34 enter corresponding passages 37 in the coacting drum 30, the passages 37 being of increasing diameter toward the inner portion of the drum 30 to afford ready clearance for and escape of the pieces of film material cut out by the punches.

As shown in Figure 3, lower drum 30 is provided with an indication to mark the place on the drum at which the first frame of the film is placed in starting it through the machine. This marking is illustrated as a transverse line 40 and the numeral 1, indicated at 41, proximate thereto.

Rotating synchronously with the drum 30, as by being mounted on the shaft 22 on the opposite side of frame 18 is a dial or indicator 45. This indicator bears a scale 46 divided into the same number of equal parts as the number of perforations comprising one beat in the tempo with which the film is marked. Thus, if the scale is provided with perforations to give a tempo of twelve per unit of time, the dial 45 is divided up into twelve equal spaces numbered from 1 to 12, respectively. The dial 45 is so mounted on the shaft 22 that the subdivision of a particular beat appearing before a window 47 in a casing enclosing the machine, corresponds to that frame of a beat appearing before the eye of the observer, as will hereinafter be described, so that the observer, looking at the dial 45 can tell exactly where, that is, to which note for instance, in the bar on the scale sheet, the action depicted on the frame relates. The dial 45 also actuates, as by a pitman 48 connected to a crank 41 on shaft 22, a counter 49, the numbers of which are advanced once every time the indicator 45 is turned through 360°, that is, every time the numeral 1 appears before the window 47, and a beat frame 13 comes into view, thus indicating the next beat and that another group of twelve frames has passed through the machine.

Referring now to Figure 1, in front of the perforating drums 28, 30, that is, on the right as viewed in that figure, the base 16 is provided with spaced upwardly extending brackets 50, 51, respectively, upon which is mounted an inclined flat plate 52, lying at a convenient angle and forming a surface or table over which the film passes after it has been provided with tempo indications. This table 52 is provided with an aperture 53 through which light may pass from a source of illumination, such as the incandescent lamp 54. The opening 53 may, conveniently, be covered by a translucent plate 55, say, of ground glass.

Pivotally mounted, as at 58, along one side of the plate 52 and in spaced relation to the surface of the plate, is a viewing member comprising a plate 60 formed with a rectangular aperture 61 conveniently the same shape and size as one frame of the film, which aperture is adapted to register with the light aperture 63 and is surrounded by a cylindrical wall 62 carrying, preferably, a magnifying lens 63 through which the film is viewed. Thus the viewing member 62 may be thrown about its pivot 58 from the operative position shown in Figures 1 and 5 to the inoperative position shown in Figure 3 to permit a film to be placed in position between the table 52 and the plate 60 which thus form a passage for the film therebetween. The table 52 is also provided with a pair of spaced elongated slots 65 which, in the illustrated embodiment, form extensions of the sides of light passage 53. Sprockets 70, provided with teeth to register with the sprocket holes 11 in the film protrude through the slots 65 and serve to advance the film beneath the viewing lens. The sprockets 70 are mounted upon a shaft 69 rotatable in a bracket 67 fixed on the under side of the table. The sprocket shaft 69 is given a periodic movement to advance the frames seriatim beneath the viewing lens 63 in timed relation to the rotation of the tempo marking drums 28, 30. As shown, the sprocket shaft 69 carries a Geneva wheel 73 (Figure 5) actuated by a driver 72 on Geneva shaft 71 also carried by the brackets 67. Shaft 71 carries a gear 68 meshing with a gear 74, mounted on a shaft 75 rotatable on the bracket 18, on which is also carried a gear 76 meshing with the gear 26. The shaft 71 also carries a crank 78, Figure 3, by means of which the shaft 71 may be given a half revolution to advance the film the distance of one frame through the machine. Thus the film may be advanced through the machine either by the crank 29 or by the crank 78.

The film travels through the machine and the tempo indications are applied thereto in the following manner: The first frame on the film is caused to register with the indications 40, 41 on the drum 30 and then as the drum is rotated, the film is advanced in a clockwise direction, as viewed in Figure 1, between the tempo marking rolls 28 and drum 30. A pick-up blade 80, Figure 1, disengages the film from the punch pins 34 and the film is led downwardly around an idler roll 82, through an aperture 84 in the bracket 50 and beneath the film protecting shield 86 of lamp 54 through a similar passage 88 in the bracket 51 and upwardly around the idler 89 across the face of the table 52, beneath the viewing member 62 and into engagement with the sprockets 70. By the time the film has reached sprockets 70, a number of tempo indications have been respectively applied to successive frames, as will be understood.

The numerals 46 on the dial 45 are so disposed that the number 1 appears before the window 47 at a time when the first frame appears before the window 61 to be viewed by the operator. Then, every time the crank 78 is turned one half revolution, the film is advanced a distance of one frame before the lens 63, while the drums 28 and 30 are similarly advanced an arcuate distance of one frame to punch another tempo indication in a succeeding frame 12. As a frame bearing a tempo indication marking the beginning of each succeeding beat, i. e., a beat frame 13, arrives before the lens 63, and, therefore, as the indicator 45 has made one revolution, the counter 49 moves one number.

A person sitting before the apparatus and viewing each frame as it appears beneath the lens 63 makes appropriate indications on the score as the film is advanced and can always locate the proper bar or place on the scale since it bears a definite relation to the beat as well as to the number on the indicator 45. The present invention makes the beat very easy to follow as the distance of the light transmitting marks above the bottom of the frame vary progressively giving a steady stream of light moving up and down for every beat while viewing the same, both when passing beneath the viewing member 62 and when projected, and the score and musical effect may easily be written and followed. Thus in writing or editing the score, if the beat be on 12, two beats to a bar, and it is found that sound effect is necessary for the picture, for instance, a cymbal crash, by looking at the dial 45 and counter 49, the correct place will be indicated where the notation should be written in the score. For example, if the counter indicated the twentieth beat and the dial indicated the seventh exposure, the notations for the cymbal crash would then be written in the music on the up-beat of the tenth bar.

If, for instance, a translucent area or perforation appeared only in each beat frame, if the music is on two-fourths time, the tempo of the beat set at 12 would give two beats per second and would make flashes of projected light indicating a beat almost impossible to follow, since the film is passed through a projecting machine at twenty-four exposures or frames per second.

In every instance, the punch mark in the beat frame and preferably also in the immediately preceding or last frame of a group is the same distance above the bottom. The punch mark in the frame succeeding the beat frame and in the next to the last frame of the group is a greater distance above the bottoms of the frames and, if desired, the distances may be the same. Similarly for every other two corresponding frames, the distances may be the same although progressively greater, while the two middle frames of a group will have tempo indications at the greatest distance from the bottom. Then, when the film is viewed, the tempo indications will appear as a spot or streak of light moving steadily up and down and give the exact timing of the beat. Preferably, however, transparent areas formed in any manner either by removal of emulsion, photographically, coloring or perforating are so positioned on successive frames as to give the effect of a stream of light moving up slower and down faster into a beat on the film as this is more easily followed.

Obviously, in certain of its aspects, the apparatus of this invention is not limited to the perforations of the film, but, by omitting the punch pins or substituting therefor other devices applying any other form of tempo marking to successive frames, the film may be advanced beneath the viewing lens and an accurate indication of the tempo obtained by a dial and counter.

Various modifications will occur to those skilled in the art in the disposition and configuration of the component elements going to make up the invention as a whole, as well as in the selection of and substitution for individual elements thereof in desired combination and no limitation is intended by the phraseology of the foregoing description or illustrations in the accompanying drawings.

What is claimed is:—

1. Apparatus of the character described comprising means to repeatedly punch a series of tempo indications in the frames of a motion picture film, which indications are visible upon projection of the film, the respective tempo indications occupying successively varying positions in the respective successive frames, means to view said frames successively, means operable to convey the film from the applying means to the viewing means, automatically operated tempo indicating means movable synchronously with the respective frames as they move successively past the viewing position and automatically operated means enumerating the successive series of tempo indications.

2. In a machine of the character described, in combination, means to advance a motion picture film, punch means, means to automatically move said punch means into contact with predetermined frames of said film as it advances to apply markings thereto, sprocket wheels to receive said film after leaving the advancing means, operative connections between said advancing means and the sprocket wheel whereby said sprocket wheel and advancing means are rotated synchronously to move a predetermined frame before a given point and an indicator moved synchronously with the punch means to indicate said frame as it arrives at said point.

3. In a machine of the character described, in combination, means to advance a motion picture film, punch means, means to automatically move said punch means into contact with successive frames of said film as it advances to apply markings thereto in successively varying positions on successive films, sprocket wheels to receive said film after leaving the advancing means, operative connections between said advancing means and the sprocket wheel whereby said sprocket wheel and advancing means are rotated synchronously to move a predetermined frame before a given point, an indicator turned synchronously with the punch means to indicate said frame as it arrives at said point and counting mechanism actuated by the indicator.

4. In a machine of the character described, in combination, a sprocket drum, a drum rotating tangentially thereto, means carried with the last named drum to punch a film passed between the two drums, sprocket wheels to receive a film after leaving the drums, means proximate the sprocket wheels to view said film, operative connections between one of said drums and the sprocket wheels whereby said sprocket wheel and drums are rotated synchronously, a dial rotated synchronously with the sprocket wheel and timing mechanism actuated by the dial upon each revolution.

5. In a machine of the character described, in combination, a drum formed with sprockets to receive the sprocket holes of a motion picture film, a drum rotating tangentially thereto, punch pins carried with the last named drum to punch a film passed between the two drums, means to rotate said drums to advance the film, a table formed with a light passage, a source of light beneath the table, means to conduct a film from the drum above the table past said passage, sprocket wheels protruding through slots formed in the table to receive a film after passing the light passage, operative connections between one of said drums and the sprocket wheels whereby said sprocket wheels and drums are rotated synchronously, a dial rotated synchronously with the sprocket wheel, counting mechanism actuated by the dial upon each revolution and a viewing member comprising a lens in register with the light passage.

6. In a machine of the character described, in combination, a sprocket drum, a drum rotating tangentially thereto and means carried with one of said drums to repeatedly punch predetermined tempo indications in selected frames of a film passed between the two drums.

7. In a machine of the character described, in combination, a sprocket drum, a drum rotating tangentially thereto, means carried with one of said drums to repeatedly punch predetermined tempo indications in selected frames of a film passed between the two drums and means to rotate the drums.

8. Apparatus of the character described comprising means to repeatedly apply a series of tempo indications to successive frames of a motion picture film, the respective tempo indications occupying varying positions, respectively, in successive frames, means to view said frames successively, means operable to convey the film from the applying means to the viewing means, tempo indicating means movable synchronously with the respective frames as they move successively past the viewing position to indicate the tempo indication of the series in that position and automatically operated means enumerating the successive series of tempo indications.

GORDON I. ROBERTS.
GEORGE H. RUFLE.